(12) United States Patent
Timus et al.

(10) Patent No.: US 9,119,107 B2
(45) Date of Patent: Aug. 25, 2015

(54) METHODS AND DEVICES FOR SUPPORTING BACKHAUL SELECTION

(75) Inventors: Bogdan Timus, Spånga (SE); Catalin Meirosu, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 149 days.

(21) Appl. No.: 13/982,802

(22) PCT Filed: Feb. 4, 2011

(86) PCT No.: PCT/SE2011/050122
§ 371 (c)(1),
(2), (4) Date: Jul. 31, 2013

(87) PCT Pub. No.: WO2012/105881
PCT Pub. Date: Aug. 9, 2012

(65) Prior Publication Data
US 2013/0310052 A1 Nov. 21, 2013

(51) Int. Cl.
*H04W 74/00* (2009.01)
*H04W 4/00* (2009.01)
(Continued)

(52) U.S. Cl.
CPC .......... *H04W 28/10* (2013.01); *H04W 72/0433* (2013.01); *H04W 28/08* (2013.01); *H04W 84/047* (2013.01); *H04W 92/045* (2013.01)

(58) Field of Classification Search
CPC ....... H04W 4/16; H04W 92/02; H04W 84/12; H04W 84/18
USPC ........... 455/422.1, 428, 449, 450–451, 452.1, 455/453, 455; 370/338, 227
See application file for complete search history.

(56) References Cited

U.S. PATENT DOCUMENTS 8,358,577 B1 * 1/2013 Khanka et al. ................ 370/221
2007/0030809 A1 * 2/2007 Dayama ........................ 370/237
(Continued)

FOREIGN PATENT DOCUMENTS

JP 2004-072198 A 3/2004
JP 2010-154150 A 7/2010
(Continued)

OTHER PUBLICATIONS

O. Teyeb et at.: "Dynamic Relaying in 3GPP LTE-Advanced Networks" Hindawi Publishing Corporation; EURASIP Journal on Wireless Communications and Networking; vol. 2009, Article ID 731317, 11 pages; doi:10.1155/2009/731317.
(Continued)

*Primary Examiner* — Dung Hong
(74) *Attorney, Agent, or Firm* — Myers Bigel Sibley & Sajovec, P.A.

(57) ABSTRACT

Methods and devices are disclosed for backhaul selection in a wireless communication network. A first radio base station has access to a first backhaul path through an out-of-band interface and to a second backhaul path, via a second radio base station, through an in-band interface. According to a method, a network entity sends, to the second radio base station, a request for available capacity on the second backhaul path for backhauling of the first radio base station. The second radio base station derives a total available capacity from an estimate of available capacity for backhauling on a backhaul path from the second radio base station to a core network and from an estimate of available capacity for backhauling on the in-band interface and signals the total available capacity to the network entity. The network entity selects backhaul path based on the received information on the total available capacity.

29 Claims, 4 Drawing Sheets

(51) Int. Cl.
    *H04W 40/00*  (2009.01)
    *H04W 72/00*  (2009.01)
    *H04L 1/00*  (2006.01)
    *H04W 28/10*  (2009.01)
    *H04W 72/04*  (2009.01)
    *H04W 28/08*  (2009.01)
    *H04W 84/04*  (2009.01)
    *H04W 92/04*  (2009.01)

(56) References Cited

U.S. PATENT DOCUMENTS

| | | | | |
|---|---|---|---|---|
| 2007/0218910 | A1* | 9/2007 | Hill et al. | 455/445 |
| 2008/0002631 | A1* | 1/2008 | Ramachandran | 370/338 |
| 2008/0151834 | A1* | 6/2008 | Natarajan | 370/331 |
| 2010/0238826 | A1* | 9/2010 | Borran et al. | 370/252 |

FOREIGN PATENT DOCUMENTS

| | | |
|---|---|---|
| WO | WO 2007/106652 A2 | 9/2007 |
| WO | WO 2008/002702 A2 | 1/2008 |
| WO | WO 2010/049354 A1 | 5/2010 |
| WO | WO 2011/038783 A1 | 4/2011 |
| WO | WO 2012/002849 A1 | 1/2012 |

OTHER PUBLICATIONS

International Search Report, Application No. PCT/SE2011/050122, Sep. 22, 2011.

Written Opinion of the International Searching Authority, Application No. PCT/SE2011/050122, Sep. 22, 2011.

P. Chimento et al., "Defining Network Capacity", Internet Engineering Task Force (IETF), Request for Comments: 5136, Feb. 2008, 13 pp.

S. Bradner, "Benchmarking Terminology for Network Interconnection Devices", Internet Engineering Task Force (IETF), Request for Comments: 1242, Jul. 1991, 12 pp.

English Translation of Japanese Office Action—Japanese Patent Application No. 2013-552488, mailed Aug. 4, 2014.

* cited by examiner

METHODS AND DEVICES FOR SUPPORTING BACKHAUL SELECTION

CROSS REFERENCE TO RELATED APPLICATION

This application is a 35 U.S.C. §371 national stage application of PCT International Application No. PCT/SE2011/050122, filed on 4 Feb. 2011, the disclosure and content of which is incorporated by reference herein in its entirety. The above-referenced PCT International Application was published in the English language as International Publication No. WO 2012/105881 A1 on 9 Aug. 2012.

TECHNICAL FIELD

The present invention relates to backhauling in a wireless communications system, and in particular to selection of a backhaul path through an out-of band interface or through an in-band interface.

BACKGROUND

A backhaul portion of a communication network is the intermediate links between a core network and access points of the communication network. Backhaul paths are e.g. used to connect radio base stations to a base station controller and to connect a large company's site to a metro Ethernet network. A backhaul path may be a wireless link, a wireline link or a combined wireless and wireline link. Accordingly different backhaul technologies may be used such as e.g. transmission technologies over optical fiber or copper cable, terrestrial or satellite point-to-point microwave radio relay transmission, different Digital Subscriber Line (DSL) technologies, Synchronous Digital Hierarchy (SDH) or Synchronous optical networking (SONET), or Ethernet.

There is a continuous development of new generations of mobile communications technologies to cope with increasing requirements of higher data rates, improved efficiency and lower costs. 3GPP Long Term Evolution (LTE) is a project within the 3rd Generation Partnership Project (3GPP) to improve the Universal Mobile Telecommunications System (UMTS) standard. The Universal Terrestrial Radio Access Network (UTRAN) is the radio access network of a UMTS and Evolved UTRAN (E-UTRAN) is the radio access network of an LTE system. In an E-UTRAN, a user equipment (UE) is wirelessly connected to a radio base station (RBS) commonly referred to as an evolved NodeB (eNB). A radio base station is a general term for a radio network node capable of transmitting radio signals. A radio base station may e.g. be a macro base station, a micro base station, a home eNodeB, a beaconing device, or a relay.

A majority of LTE base stations (i.e. eNBs) are expected to be deployed on legacy sites, which were originally designed for older types of radio base stations. The backhaul for these sites are typically designed for High Speed Packet Access (HSPA) data rates or lower and therefore cannot support the full traffic of a LTE base station. Therefore operators are replacing the existing backhaul with connections with significantly higher capacity. Due to its cost, this replacement will be made gradually so that some sites will have high data-rate backhauls while others will still have low data-rate backhauls.

Current standardization efforts within 3GPP for LTE-Advanced (LTE-A) will provide an alternative solution to using e.g. a cable or a micro-wave link as backhaul medium. The alternative solution is to allow an eNB in LTE-A to backhaul its data through another eNB, by using the same technology and the same frequency band as the access links. The new interface is called Un.

Backhauling that is achieved by using the same technology and the same frequency band as the access links will herein be referred to as in-band backhauling. Self-backhauling is another term that is sometimes used synonymously with the term in-band backhauling as defined herein. Analogously the term out-of-band backhauling will be used herein to refer to backhauling that uses a different technology and/or frequency band than the access links of the communications network. Similarly the term in-band interface will be used herein to refer to an interface that uses the same technology and frequency band as is used for access in the communications network and the term out-of-band interface will be used to refer to an interface that uses a different technology and/or frequency band than is used for access purposes.

The idea of in-band backhauling is to connect eNBs that do not have any out-of band backhaul to other eNBs that do have an out-of band backhaul.

In some cases an access point may have access to a plurality of alternate backhauls, such that the access point might change backhaul if there is a problem with a currently used backhaul.

The U.S. patent application US2007/0030809 A1 discloses a method comprising detecting a decrease in throughput over a current backhaul, determining whether there is an alternate backhaul available, and accessing the alternate backhaul.

Throughput is defined by the Internet Engineering Task Force (IETF) document RFC1242 as the maximum frame rate at which none of the offered frames are dropped by the device being measured. By extension, throughput along a network path is the maximum transfer rate at which no frames are dropped along the path. In practice, it has been observed that throughput values that could be measured along a network path depend on the protocol stack employed. As such, throughput measurements are specific to a given application and involve performing repeated experiments in order to determine the maximum transfer rate where no loss is observed. Such process is expensive in terms of network resource usage and potentially time consuming.

The available capacity on an IP link is defined in the IETF document RFC5136 as the link capacity multiplied by the complement of link utilization. In contrast with throughput measurements, there is a body of prior work that describes how to measure the available capacity on an IP link using methods which are less invasive than throughput measurements. Tools such as IGI, Yaz, pathChirp and BART (bandwidth available in real-time) are a few examples in this respect.

Manual backhaul configuration of a network may be a tedious and costly operation. Furthermore the fact that backhaul capacity may change in time and these capacity changes are independent on when the eNB are deployed and configured for the first time, may render manual backhaul configuration difficult. In addition, a network may have a very large number of eNBs. Therefore it is desired that backhauling may be automatically reconfigured.

The international patent application WO2007/106652A2 describes a controller that can dynamically select from a plurality of backhaul sites with which an access point can communicate via wireless backhaul channels. The controller can also generate a control signal that indicates to the access point to beam steer a backhaul signal to a certain backhaul site. The selection of backhaul site is based on information about the bandwidth capability of the backhaul site, e.g. if the backhaul site has a fiber optic connection, a T-1 connection or an ISDN or cable connection to a network node.

The known prior-art methods using throughput measurements does not necessarily yield a good estimate of the end-to-end available capacity for backhauling of an eNB, because of the underlying resource allocation and reservation techniques at the eNB. Furthermore many of the above mentioned prior art methods are not specifically adapted to a scenario in which a base station can select between an out-of-band backhaul and an in-band backhaul.

There is therefore a demand for improved methods and devices for backhaul selection and backhaul support that can provide good estimates of end-to-end available capacity for backhauling in a manner that is time efficient and efficient in terms of network resource usage.

SUMMARY

An object of the present invention is to provide improved methods and devices for supporting backhaul selection in a wireless communication system.

The above stated object is achieved by means of methods and devices according to the independent claims.

A first embodiment provides a method in a network entity of a wireless communication system for selection of a backhaul path to a core network for a first radio base station. The first radio base station has access to a first backhaul path to the core network through an out-of-band interface and access to a second backhaul path to the core network, via a second radio base station, through an in-band interface. The method comprises a step of sending, to the second radio base station, a request for available capacity on the second backhaul path for backhauling of the first radio base station. The method also comprises a step of receiving, from the second radio base station, a response including information on a total available capacity on the second backhaul path for backhauling of the first radio base station. The total available capacity has been derived from an estimate of available capacity for backhauling on a backhaul path from the second radio base station to the core network and from an estimate of available capacity for backhauling on the in-band interface. Another step of the method involves selecting the first backhaul path or the second backhaul path for a portion of traffic based on the received information on the total available capacity on the second backhaul path for backhauling of the first radio base station.

A second embodiment provides a method in a radio base station of a wireless communication system for providing backhaul support. The radio base station has an in-band interface for wireless communication with a set of one or more other radio base stations and has access to a backhaul path to a core network. The method comprises a step of receiving, from a network entity, a request for available capacity for backhauling of another radio base station via the in-band interface and the backhaul path. The method also comprises a step of measuring the available capacity for backhauling of the other radio base station by estimating available capacity for backhauling on the backhaul path and estimating available capacity for backhauling on the in-band interface to derive a total available capacity for backhauling of the other radio base station via the in-band interface and the backhaul path. Another step of the method involves sending, to the network entity, a response comprising the total available capacity for backhauling of the other radio base station.

A third embodiment provides a network entity for use in a wireless communication system. The network entity is configured for selection of a backhaul path to a core network for a first radio base station. The first radio base station has access to a first backhaul path to the core network through an out-of-band interface and access to a second backhaul path to the core network, via a second radio base station, through an in-band interface. The network entity comprises a transmitter, a receiver and processing circuitry. The transmitter is configured to send, to the second radio base station, a request for available capacity on the second backhaul path for backhauling of the first radio base station. The receiver is configured to receive, from the second radio base station, a response including information on the available capacity on the second backhaul path for backhauling of the first radio base station. Furthermore, the processing circuitry is configured to select the first backhaul path or the second backhaul path for a portion of traffic based on the received information on the available capacity on the second backhaul path for backhauling of the first radio base station.

A fourth embodiment provides a radio base station for use in a wireless communication system. The radio base station comprises a receiver, a transmitter and processing circuitry. The radio base station also comprises an in-band interface, which is configured for wireless communication with a set of one or more other radio base stations. In addition, the radio base comprises an interface through which the radio base station has access to a backhaul path to a core network. The receiver is configured to receive, from a network entity, a request for available capacity for backhauling of another radio base station via the radio base station and the backhaul path. The processing circuitry is configured to measure the available capacity for backhauling of the other radio base station by estimating available capacity for backhauling on the backhaul path and estimating available capacity for backhauling on the in-band interface to derive a total available capacity for backhauling of the other radio base station via the in-band interface and the backhaul path. Furthermore, the transmitter is configured to send, to the network entity, a response comprising the total available capacity for backhauling of the other radio base station.

Fifth and sixth embodiments provide machine-readable media that provides instructions, which when executed by processing circuitry, cause a network entity to perform the method according to the first and second embodiment respectively.

Advantages and further features of embodiments of the present invention will become apparent when reading the following detailed description in conjunction with the drawings.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
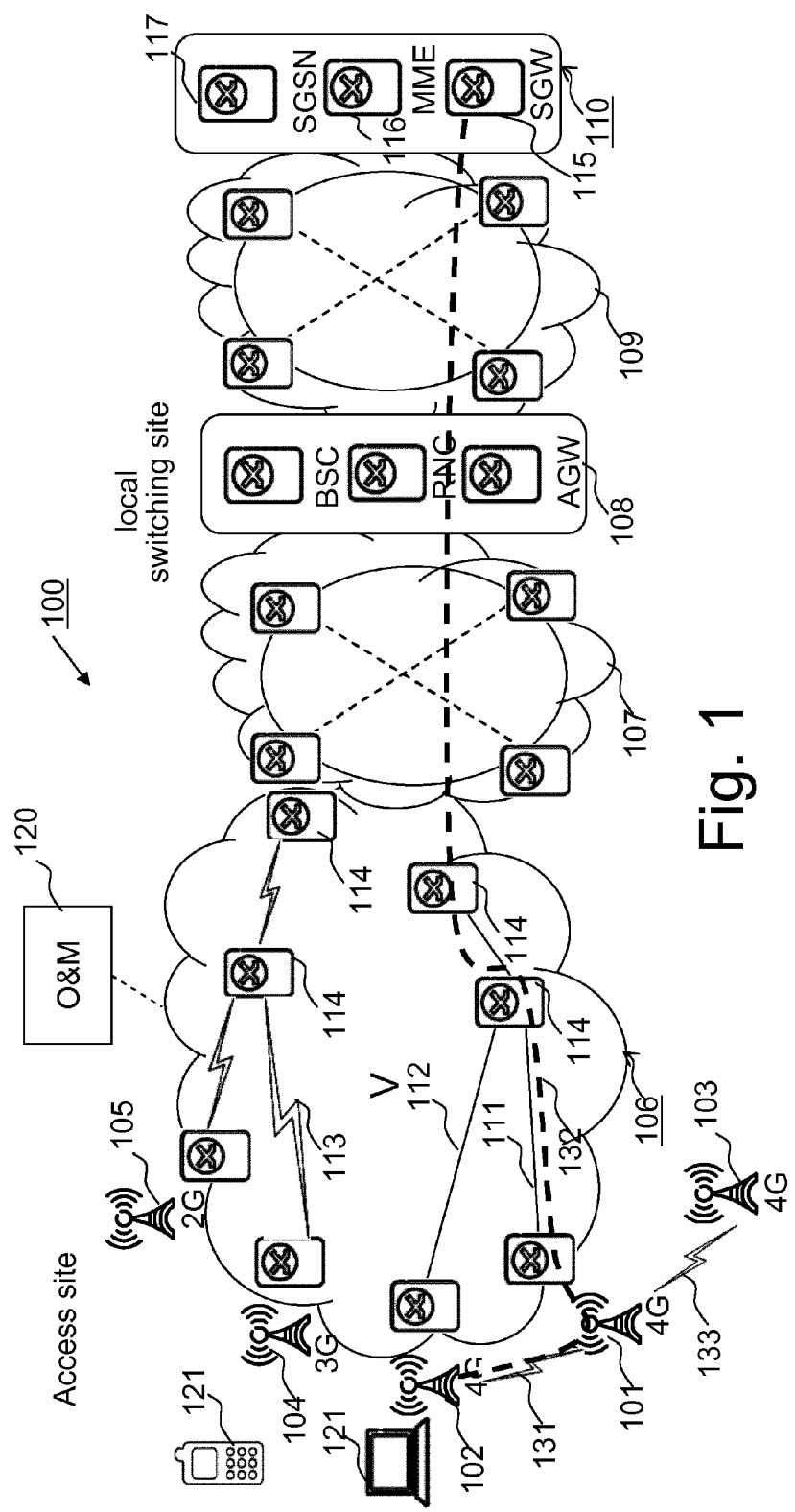
FIG. 1 is a schematic block diagram illustrating a wireless communication system in which embodiments of the present invention may be implemented.

FIG. 1 is a schematic block diagram illustrating an exemplary wireless communication system 100 in which embodiments of the present invention may be used. In FIG. 1 a backhaul architecture is illustrated according to which a number of radio base stations 101, 102, 103, 104 and 105 are connected to a core network 110, via broadband access network 106, an aggregation network 107, a local switching site 108 and a transport network 109. The core network 110 is in this example assumed to be a core network in accordance with 3GPP's definition of the term. The broadband access network 106 comprises a number of devices 114, which e.g. may be micro wave devices such as Passive Optical Network (PON), Gigabit PON (G-PON), or Ethernet devices. The illustrated nodes of the aggregation network 107 are switches or routers. The radio base stations 101-105 may serve different types of user equipments (UEs) 121 such as mobile phones, computers, personal digital assistants (PDAs) etc by providing wireless access to the wireless communication system 100 using some access technology, such as LTE or HSPA.

The links between the radio base stations 101-105 and the core network 110 may be referred to as the backhaul portion of the wireless communication system 100. It is however to be understood that the backhauling architecture illustrated in FIG. 1 is merely an example and that other types of backhauling architectures e.g. with more or less intermediate networks between the radio base stations 101-105 and the core network 110 may be used.

Typically, a physical topology of an access network, such as the broadband access network 106, is a star topology as illustrated in FIG. 1. Hence the capacity of a backhaul connection (from an access point such as one of the radio base stations 101-105 to the core network 110) is not uniquely determined by the last hop connection. Instead the capacity depends on the entire chain of connections up to the core network 110. Therefore it is not trivial to manually configure at the base station the capacity of the backhaul. Moreover, an initial configuration may become suboptimal or obsolete after some time.

The core network 110 typically has several gateway nodes, such as Serving Gateways (SGW). An eNB could be connected to any of these SGWs. It may also be logically connected to multiple SGWs. Moreover two eNBs which are geographically close may be logically connected to different SGWs. In FIG. 1, the core network 110 is illustrated to include a SGW 115, a Mobility Management Entity (MME) 116 and a Serving GPRS Support Node (SGSN) to exemplify some different types of core networks nodes.

In FIG. 1 it is assumed that the radio base stations 101-103 are eNBs. The radio base station 101 has access to a backhaul path 111 through an out-of-band interface. A backhaul path through an out-of-band interface will herein also be referred to as an out-of-band backhaul. The radio base stations 101, 102, 104 and 105 are connected to the local access network 107 through out-of-band backhauls 111, 112 and 113 of various capacities, and also have the ability to establish between each other wireless backhaul connections 131, e.g. using the Un interface. The radio base stations 102 and 104 have access to out-of-band backhauls 112, and 113 respectively. The out-of-band backhauls 111, 112, and 113 may be wireline or wireless. The radio base station 103 does not have an out-of-band backhaul. Therefore the radio base station 103 has to rely on backhauling through in-band backhaul connections such as the illustrated connection 133.

As mentioned above the capacity of a backhaul path from an access point to the core network is usually not uniquely determined by the last hop connection. However for the embodiments presented herein it is the last hop and the interface between the backhaul path and the radio base station 101-105 that is primarily of interest. Therefore connections beyond the backhaul connections connected to the radio base stations will not be specifically considered in this description.

In the exemplary scenario illustrated in FIG. 1 it is assumed that the backhaul 111 has high capacity, but the backhaul 112 has low capacity. The eNB 102 could however route its data through the eNB 101 by establishing a wireless backhaul connection 131 between the eNB 102 and the eNB 101. Although this relaying technique consumes a part of the wireless access spectrum and loads the backhaul 111 of the eNB 101, it may nonetheless lead to a backhaul path 132 with higher capacity than what the out of band backhaul 112 can offer.

In the considered scenario, the backhauls 112 and 132 may become congested at different times or may have their capacity changed, due to various reasons. Therefore a fixed (i.e. time-static) backhaul selection is suboptimal. Instead, an automatic mechanism for backhaul reconfiguration for the eNB 102 is desired.

Embodiments presented herein focus on a scenario with at least two radio base stations, each of them having an out-of-band backhaul, and also having the possibility to establish a wireless connection to another eNB, e.g. through a Un interface. The embodiments to be described in further detail below may enhance overall quality of the service provided to UEs by the radio base station and allow for, or support, selection among the available backhaul alternatives for radio base station so as to fulfill e.g. quality of service requirements or cost requirements.

An embodiment, which will be explained in further detail below, lets a first radio base station such as an eNB, with a low capacity backhaul collaborate with potential donor radio base station in measuring the capacity of an alternative backhaul path via an in-band backhaul connection between the two radio base stations. A straight forward approach of obtaining an end-to-end throughput measurement would be to use so-called brute-force probing, which would mean that the first radio base station would perform an invasive measurement without consent from the potential donor radio base station. Accordingly the donor base station would not be aware of the purpose of the measurement, i.e. for backhauling of the first radio base station. Unlike the brute-force probing of the end-to-end throughput, the measurement point is moved to the potential donor radio base station, so that it can make a decision on capacity available for backhauling of the first radio base station. The decision is based both on backhaul measurements and on radio resource allocation schemes that the potential donor radio base station already implements. Thus the decision on capacity available for backhauling of the first radio base station reflects the end-to-end performance.

Figure 2:
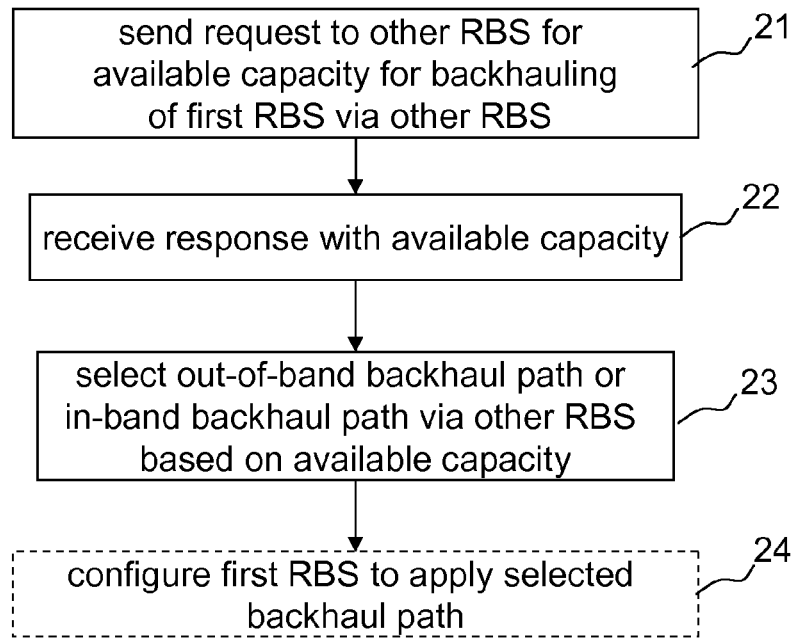
FIG. 2 is a flow diagram illustrating a method for selection of a backhaul path according to an embodiment described herein.
Figure 3:
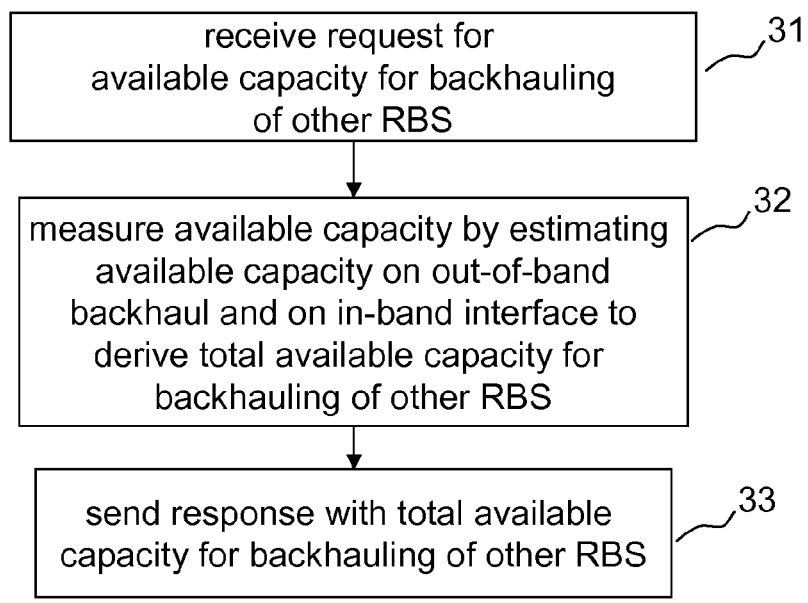
FIG. 3 is a flow diagram illustrating a method for providing backhaul support according to an embodiment described herein.

FIG. 2 is a flow diagram of an embodiment of a method in a network entity for selection of a backhaul path for a first radio base station, such as the eNB 102. FIG. 3 is a flow diagram of an embodiment of a method for providing backhaul support. The methods in FIGS. 2 and 3 will now be described based on the scenario with the eNB 102 and the eNB 101, where it is assumed that the backhaul path 112 has low capacity while the backhaul path 111 has high capacity. Thus the eNB 102 may request backhauling capacity through the eNB 101. The eNB 102 may therefore, in this scenario be referred to as a requesting eNB, while the eNB 101 may be referred to as a donor, or potential donor, eNB. The method illustrated in FIG. 2 corresponds to the method that would be carried out in the network entity that requests backhaul capacity from the donor eNB 101 and selects the backhaul path to be applied. This network entity may be located in the requesting eNB 102 or in another location in the wireless communication system 100, such as comprised in an operation and management system 120. The method illustrated in FIG. 3 corresponds to the method that would be carried out in the donor eNB 101 when receiving the request from the network entity. It is however to be noted that both the methods could be implemented in the same physical eNB, for instance in an LTE-Advanced eNB, but for any pair of communicating eNBs one will execute the method illustrated in FIG. 2 and the other will execute the method illustrated in FIG. 3.

In a step 21 of the method illustrated in FIG. 2 the network entity that is to perform backhaul selection for a first radio base station (here the eNB 102) sends a request to another radio base station (here the eNB 101) for available capacity for backhauling of the first radio base station 102 via the other radio base station 101. This request can be addressed either through a temporary X2 connection established over the low capacity out-of-band backhaul 112, or through an LTE air interface protocol, or through any other known communication method. Moreover, the request can be expressed as an admission request, or as an attachment request, or as an add-on to an existing protocol for establishing Un wireless connections.

In a step 22, the network entity receives a response from the potential donor eNB 101. The response includes information on a total available capacity that the potential donor eNB can or is willing to offer for backhauling of the eNB 102. The total available capacity has been derived from an estimate of available capacity for backhauling on the backhaul path 111 and from an estimate of available capacity for backhauling on the in-band backhaul connection 131 that would need to be established. In other words the donor eNB 101 makes a decision on the capacity that it can and/or is willing to offer for backhauling of the eNB 102 by considering available capacity both on the out-of band backhaul 111 as well as on the in-band backhaul connection 131.

In a step 23, the network entity then selects the out-of-band backhaul path 112 or the in-band backhaul path 132 based on the information received in the response from the eNB 101. The step 23 may comprise comparing the available capacity on the out-of-band backhaul 112 with the information on the total available capacity received from the eNB 101 and selecting the backhaul with the largest available capacity. In other cases additional criteria may also considered in the selection of backhaul for the eNB 102. An example of an additional criterion that may be considered is cost, such that a difference in available capacity is weighed against a difference in cost for the different backhaul options. The result may then be e.g. that the in-band backhaul 132 is only chosen if it can provide a backhaul capacity to the eNB 102 that exceeds the available capacity on the out-of-band backhaul 112 by some predetermined amount.

In an optional step 24 the network entity may initiate configuration of the eNB 102 to apply the backhaul path that was selected in the step 24. It is also possible that the network entity initiates configuration of the eNB 101 and affected routers/switches 114 along the selected backhaul path. In LTE, the configuration may affect for instance the cell identity or any other system information which is broadcasted in the cell, according to the current 3GPP standard. It may also affect which radio resources can be allocated by a scheduler in the eNB 102 to the user terminals that it serves.

According to a practical implementation, the network entity is implemented in the eNB 102 as a requesting subsystem, which generates requests addressed to eNB 101 on a temporarily established connection, and receives answers to the request. The identity of the eNB 101 is may be detected by prior-art methods, such as measuring pathgain and selecting the eNB with the lowest pathgain. It is also possible that the request in the step 21 is addressed to several potential donor RBSs. The step 23 would then comprise a selection between the out-of-band backhaul 112 and a plurality of different in-band backhaul paths.

Now turning to FIG. 3, the eNB 101 receives the request for available capacity for backhauling of the eNB 102 in a step 31. In response, the eNB 101 measures the total available capacity in a step 32. This measurement operation includes estimating the available capacity on the out-of-band backhaul 111 as well as estimating the available capacity on the in-band backhaul connection 131. Prior art techniques for admission control may be used to estimate the end-to-end capacity on the out-of-band backhaul path 111. Methods such as for instance BART, IGI, Yaz or PathChirp could be used to measuring the capacity of the backhaul path 111 between the eNB 101 and a core network node, such as the SGW 115. The capacity of the wireless backhaul 131 may be estimated based on measuring pathgain, the occupancy of the radio resources, the amount of radio resources reserved for other purposes than backhauling in the eNB, etc. The eNB 101 may temporarily allocate the maximum amount of resources, corresponding to the total available capacity, which could be spared for backhauling of the eNB 102. Such a temporary allocation could be steered by a policy set by the operator. In a step 33 the eNB 101 sends a response including the total available capacity for backhauling of the eNB 102 via the eNB 101.

The potential donor eNB 101 is made aware by the request in step 31 that the purpose of the request is for backhauling of another eNB 102. Furthermore the eNB 101 is in control of which available capacity it indicates as available for the eNB 102 in the step 33. Thus, an advantage with this embodiment is that the indicated available capacity is reliable. If the measurement had been carried out by the requesting eNB 102 and if the potential donor eNB 101 had not been made aware that the capacity request concerned backhauling of another eNB 102, a different less reliable measurement might have been obtained. One reason for this is that if the eNB 101 believes that the capacity request is from a UE it might wish to indicate a different available capacity than for backhauling of another eNB. The capacity through the eNB 101 that is available for a requester may thus depend on the type of requester and also on other characteristics of the requester. Therefore the request in the steps 21 and 31 may include characteristics of the eNB 102, such as uplink output power, number of antennas, receiver type, noise figure etc.

According to the example illustrated in FIG. 1, the backhaul path 111 of the eNB 101 is an out-of-band backhaul. However, the method illustrated in FIG. 3 would also be applicable in a scenario where the backhaul path of the eNB 101 is an in-band backhaul e.g. to the eNB 104. In such as scenario there would be two radio hops between the eNB 102 and the out-of-band backhaul 113; a first radio hop between the eNBs 102 and 101 and second radio hop between the eNBs 101 and 104. In this scenario the eNB 101 could perform the method illustrated in FIG. 2 and request backhauling capacity from the eNB 104. The methods of FIG. 2 and FIG. 3 could analogously be extended to more than two radio hops such that the step 32 is performed using the above mentioned techniques for admission control in an iterative way along a multi-hop chain.

In the above described embodiments it is possible that the backhaul selection is made for a portion of the data that requires backhauling in the eNB 102, i.e. it is possible that the eNB 102 applies multiple backhaul paths simultaneously. It is for instance possible that different backhaul paths are applied for uplink traffic and for downlink traffic that traverses the eNB 102. In other cases the eNB 102 is allowed to use only a single backhaul path at a time. Selection of the in-band backhaul path 132 would thus imply that the backhaul path 112 is left idle for possibly later use.

Figure 4:
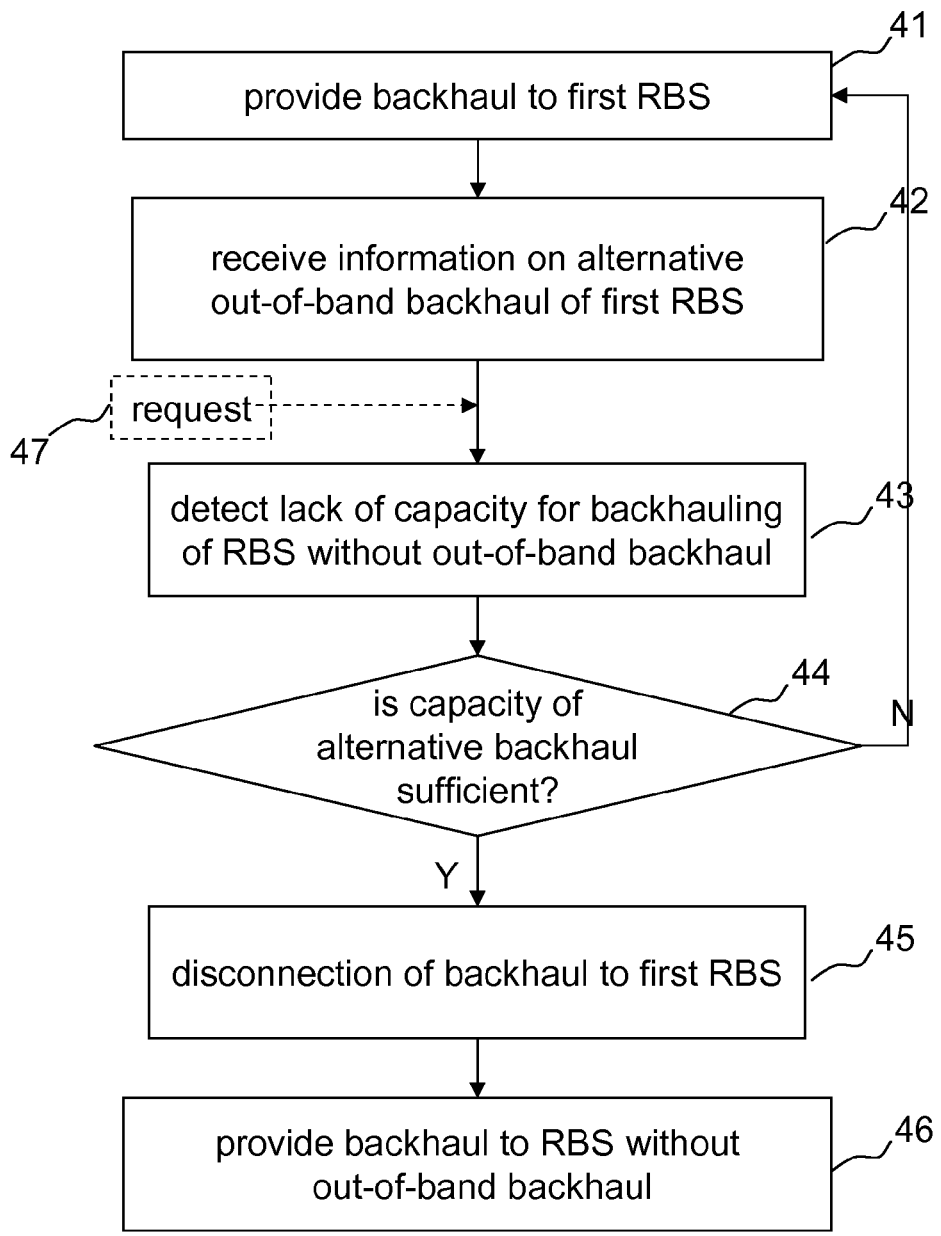
FIG. 4 is a flow diagram illustrating a method for providing backhaul support according to an alternative embodiment described herein.

FIG. 4 illustrates a method that may be carried out in a radio base station that acts as a donor radio base station for rolling back backhaul. We will again use the eNB 101 as an example of such a donor radio base station and the eNB 102 will be used to exemplify the radio base station that receives backhaul capacity from the donor radio base station. In a step 41 the eNB 101 provides backhauling to the eNB 102 via the eNB 101. In a step 45, the eNB 101 initiates disconnection, completely or partially, of the backhauling provided to the eNB 102. By allowing the donor eNB 101 to trigger a backhaul change it is possible for the eNB 101 to use this procedure as part of its radio resource management. This is an advantage compared to the above mentioned prior art methods for backhauling in which any routing decision is taken exclusively by an entity requiring backhaul support. The eNB 101 may continuously monitor the traffic and its in-band and out-of-band backhauling resources. If a traffic overload situation or resource exhaustion is detected the eNB may send a signal or a message in the step 45 which triggers the eNB 102 to, completely or partly, revert to its own out-of-band backhaul 112. Thus the donor eNB 101 is enabled to take efficient congestion control decisions. It could degrade the network performance around the eNB 102 in a graceful and controlled way to give priority to a radio base station without an out-of-band backhaul as will be explained further below. In another embodiment, the eNB 101 might renegotiate a previously agreed service level agreement with eNB 102, for instance by using monetary incentives or any other type of incentives. By allowing the donor eNB 101 to initiate a roll back of a backhaul provided to the eNB 102 if it can predict a performance degradation, the eNB 102 might be able to switch to the out-of-band backhaul 112 before a performance degradation on the in-band backhaul occurs or is detected. Thus situations where the in-band backhaul is degraded or a Service Level Agreement between the two eNBs 101 and 102 is broken might be avoided.

FIG. 4 illustrates optional steps 42-45 which may be performed in a scenario where the eNB 101 prioritizes donating backhaul capacity to a radio base station that does not have any out-of-band backhaul. In this scenario, the eNB 102 is connected through the wireless backhaul connection 131 to the donor eNB 101, because the wireless backhaul 131 and the rest of the backhaul path 111 provide higher backhaul capacity than eNB's 102 own out-of-band backhaul 112. Furthermore, the eNB 103 does not have any out-of-band connection of its own, but can be attached to the wireless communication network 100 by routing its data through the wireless backhaul connection 133, the donor eNB 101, and the out-of-band backhaul 111. However, if the donor eNB 101 admits the wireless backhaul connection 133, then the performance of the ongoing backhaul connection 131 would be degraded below an acceptable level. For instance, it would lead to the capacity of the wireless backhaul connection 131 to be degraded below a predefined threshold. If the wireless backhaul connection 131 has been established between the requesting eNB 102 and the donor eNB 101 based on a service level agreement, the eNB 101 would breach this agreement by admitting the wireless connection 133. However, the requesting eNB 103 cannot be attached to the wireless communication network 100 unless the wireless backhaul 133 is established.

The above described method is handled according to the embodiment disclosed in FIG. 4. In a step 42 the eNB 101 receives information about the out-of-band backhaul 112, i.e. the eNB 101 is made aware that the eNB 102 has an alternative out-of-band backhaul 112 that might be used instead of the in-band backhaul 132 via the eNB 101. The information may be received at different times, e.g. prior to setting up the backhaul connection 131, such as in a request according to the step 31, or after setting up the backhaul connection 131. The information about the alternative out-of-band backhaul 112 may include measurements of the capacity of the out-of-band backhaul 112. Such information about the capacity of the out-of-band backhaul 112 may be transmitted to the eNB 101 at one single occasion or may be continuously updated. The donor eNB 101 may store the information about the out-of-band backhaul 112. In a step 43, the eNB 101 detects a lack of capacity for backhauling of the eNB 103. This detection may be occasioned by reception of a request 47 for available capacity for backhauling of the eNB 103 via the eNB 101. Since the eNB 103 does not have any out-of-band backhaul the eNB 101 may decide to initiate disconnection of the backhauling provided to the eNB 102 in the step 45 to make it possible to provide backhauling to the eNB 103 in a step 46. If the eNB 101 has received information that indicates the available capacity on the out-of-band backhaul 112, the eNB 101 may determine in a step 44 if the available capacity on the out-of-band backhaul is sufficient for backhauling of the eNB 102 prior to performing the step 45. If the available capacity is believed to be insufficient, the eNB 101 may decide to not initiate any disconnection of the backhauling provided to the eNB 102.

It is to be noted that the step 45 may relate to disconnection of merely a part of the backhauling capacity provided to the eNB 102. The eNB 101 may thus send a message in the step 45 to request that the eNB 102 reduces its use of the in-band backhaul path e.g. by moving a portion of traffic to the out-of-band backhaul 112. Thus the step 44 may involve checking if there is sufficient capacity on the out-of-band backhaul 112 for at least a portion of the traffic that is currently being backhauled via the eNB 101.

As mentioned above, available capacity for backhauling may not be the only criterion considered in connection with backhaul selection. An operator may lease a backhaul connection from another company which owns the physical transport network. The cost of leasing the backhaul connection typically depends on the leased capacity and on the amount of data. In this case, the criterion for selecting between two alternative backhaul paths should include capacity information but also pricing information. For instance, a high capacity wireline connection should preferably not be leased, even if the physical connection is available, if the capacity of a wireless backhaul is sufficient and leads to overall lower costs.

Figure 5:
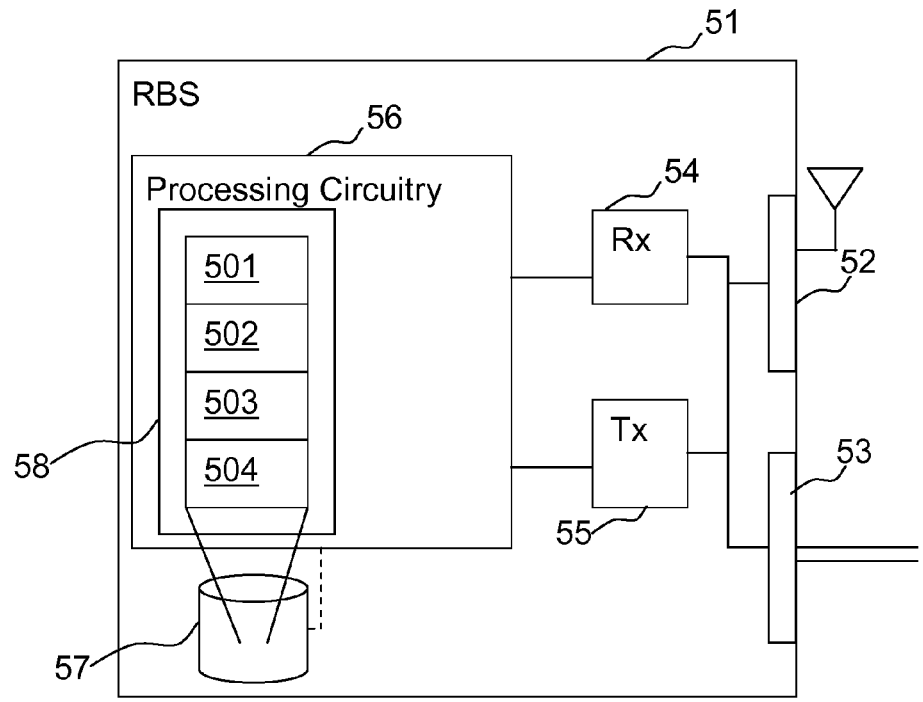
FIG. 5 is a schematic block diagram illustrating an embodiment of a radio base station.

FIG. 5 is a schematic block diagram illustrating an embodiment of a radio base station 51. The radio base station 51 may be configured to perform the method according to any or all of FIGS. 3-4. The radio base station 51 includes an in-band interface (52) configured for wireless communication with one or more other radio base stations and an out-of-band interface 53 through which the radio base station 51 has access to an out-of-band backhaul path to a core network. The radio base station furthermore comprises a receiver 54 and a transmitter 55. Alternatively the receiver 54 and transmitter 55 may be integrated in a transceiver unit. The receiver 54 may be configured to receive a request in accordance with the step 31, to receive a response in accordance with the step 22 and/or to receive information on an alternative out-of-band backhaul in accordance with the step 42. The transmitter 55 may e.g. be configured to send a request in accordance with the step 21 and/or to send a response in accordance with the step 33. Processing circuitry 56 comprised in the radio base station 51 may be configured to perform the steps 23, 24, 32, 43, 44 and/or 45 of FIGS. 2, 3 and 4 respectively. The processing circuitry 56 may be embodied in the form of one or more programmable processors programmed to perform the previously mentioned steps. However, any data processing circuits or combination of different types of processing circuits that is capable of performing the mentioned steps could be used. The radio base station 51 may also be provided with a memory 57 which is adapted to e.g. store information related to backhauling such as information on available capacity and/or instructions that may be executed by the processing circuitry 56. In the exemplary embodiment illustrated in FIG. 5, it is schematically illustrated that the processing circuitry 56 may execute instructions 58, which may be stored in the memory 57 or may be provided by some other machine-readable medium such as a flash memory or compact disc. The instructions 58 may be one or several computer programs comprising computer program submodules. In FIG. 5 a submodule 501 for controlling receiver operation, a submodule 502 for controlling transmitter operation, a submodule 503 for controlling backhaul selection and a submodule 504 for controlling backhaul capacity measurements are schematically illustrated. The submodules 501-504 essentially perform or control the steps of the flow diagrams of FIG. 2, 3 or 4. In other words, when the different submodules 501-504 are executed by the processing circuitry 56, the radio base station performs the steps 21-24, 31-33 and/or 41-46 illustrated in FIGS. 2, 3 and 4 respectively. The submodules 501-504 would generally be implemented in software, although implementations completely or partly in firmware, hardware or combinations thereof are also feasible.

Figure 6:
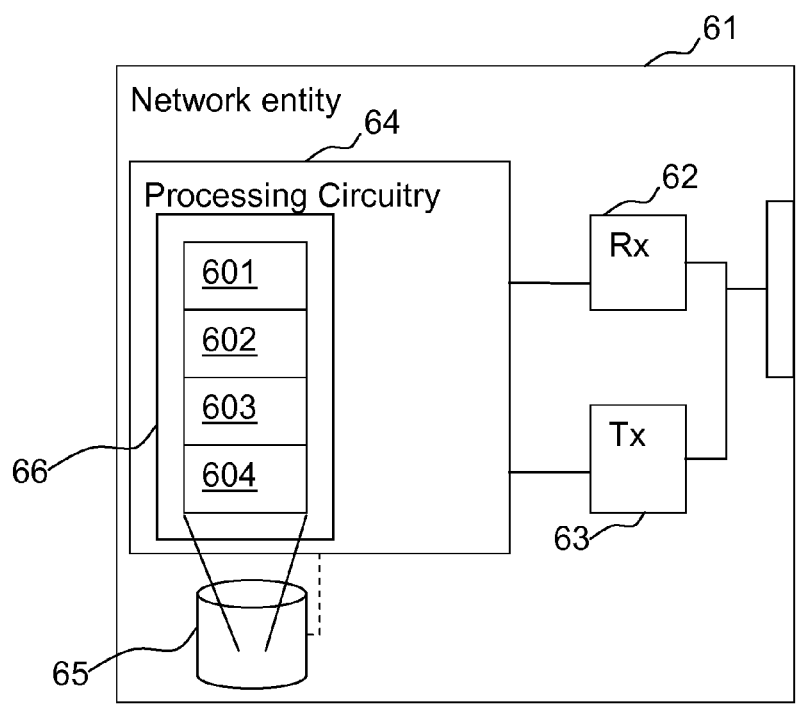
FIG. 6 is a schematic block diagram illustrating an embodiment of a network entity.

FIG. 6 is a schematic block diagram illustrating an exemplary embodiment of a network entity 61. The network entity 61 is configured to perform the method according to FIG. 2. The network entity may e.g. be comprised in an O&M system 120 or in a radio base station, such as the radio base station 51 illustrated in FIG. 5. The network entity comprises a receiver 62 and a transmitter 63. Alternatively the receiver 62 and transmitter 63 may be integrated in a transceiver unit. The transmitter 63 is particularly configured to send a request in accordance with the step 21. The receiver 62 is particularly configured to receive a response in accordance with the step 22. Processing circuitry 64 comprised in the network entity 61 may be configured to perform the steps 23 and 24 of FIG. 2. The processing circuitry 64 may be embodied in the form of one or more programmable processors programmed to perform the previously mentioned steps. However, any data processing circuits or combination of different types of processing circuits that is capable of performing the mentioned steps could be used. The network entity 61 may also be provided with a memory 65 which is adapted to e.g. store information related to backhauling such as information on available capacity and/or instructions that may be executed by the processing circuitry 64. In the exemplary embodiment illustrated in FIG. 6, it is schematically illustrated that the processing circuitry 64 may execute instructions 66, which may be stored in the memory 65 or may be provided by some other machine-readable medium such as a flash memory or compact disc. The instructions 66 may be one or several computer programs comprising computer program submodules. In FIG. 6 a submodule 601 for controlling receiver operation, a submodule 602 for controlling transmitter operation, a submodule 603 for controlling backhaul selection and a submodule 604 for initiating configuration in accordance with an executed backhaul selection are schematically illustrated. The submodules 601-604 essentially perform or control the steps of the flow diagram of FIG. 2. In other words, when the different submodules 601-604 are executed by the processing circuitry 64, the network entity performs the steps 21-24 illustrated in FIG. 2. The submodules 601-604 would generally be implemented in software, although implementations completely or partly in firmware, hardware or combinations thereof are also feasible.

From the description above it is apparent that an advantage of embodiments described herein is that overall performance of a wireless communication network may be improved by allowing for more accurate estimates of the backhaul capacity and therefore for a more efficient backhaul selection procedure than according to prior art solutions. A good estimate of end-to-end available capacity on the in-band backhaul path may be obtained since the potential donor radio base station is responsible for measuring the available capacity and this measurement is made by considering both the out-of-band backhaul of the donor radio base station and the in-band backhaul connection between the donor radio base station and the requesting radio base station. This measurement operation is less invasive than the brute-force probing methods mentioned above. According to certain embodiments the measurement of available backhaul capacity may be based on characteristics of the requesting radio base station to further increase the reliability of the measurement.

Another advantage is that embodiments described herein are particularly adapted for a scenario in which a radio base station can select between an out-of-band backhaul and an in-band backhaul.

A further advantage of some of the embodiments described herein is that they allow for automatic backhaul selection. Embodiments described herein provide means for automatic and distributed network configuration and reconfiguration, both in the radio access network and in the transport network and allow to jointly treat aspects related to the radio network and the transport network, hence optimizing the overall network performance. Network performance may be increased and operational costs may be reduced by means of automatically selecting between the out-of-band backhaul and the in-band backhaul as described herein.

An additional advantage of some embodiments described above is that they allow for simultaneous use of multiple backhauls. Thus it is possible to select different backhaul for different portions of traffic, e.g. different backhaul for uplink traffic and downlink traffic.

Yet another advantage of certain embodiments is that the backhaul selection may be used by the donor radio base station in the radio resource allocation decisions, particularly in link admission control. Information about backhaul availability and backhaul selection has previously not been treated jointly with radio resource management in cellular networks.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method in a network entity of a wireless communication system for selection of a backhaul path to a core network for a first radio base station that provides direct wireless access to user terminals, wherein the first radio base station has access to a first backhaul path to the core network through an out-of-band interface and access to at least one second backhaul path to the core network, via at least one second radio base station, through an in-band interface, the method comprising:
   sending, to the at least one second radio base station, a request for available capacity on the at least one second backhaul path for backhauling through the in-band interface of the first radio base station, wherein the request includes information about the first backhaul path;
   receiving, from the at least one second radio base station, at least one response including information on a total available capacity on the at least one second backhaul path to the core network through the in-band interface for backhauling of the first radio base station, wherein said total available capacity has been derived from an estimate of available capacity for backhauling on a backhaul path from the at least one second radio base station to the core network and from an estimate of available capacity for backhauling on the in-band interface; and
   selecting the first backhaul path to the core network through the out-of-band interface or one of the at least one second backhaul path to the core network through the in-band interface for a portion of traffic based on the received information on the available capacity on the at least one second backhaul path for backhauling of the first radio base station that provides direct wireless access to the user terminals.

2. The method according to claim 1, wherein said request includes information on characteristics of the first radio base station.

3. The method according to claim 1, wherein the selecting comprises comparing the available capacity associated with the first backhaul path and the at least one second backhaul path respectively and selecting the backhaul path with the largest available capacity.

4. The method according to claim 1, wherein said portion of traffic is uplink traffic between the first radio base station and the core network and/or downlink traffic between the core network and the first radio base station.

5. The method according to claim 1, further comprising initiating configuration of the first radio base station to apply the selected backhaul path for said portion of traffic.

6. The method according to claim 1, wherein the network entity is comprised in the first radio base station.

7. The method according to claim 1, wherein the network entity is comprised in an operation and management system of the wireless communication system.

8. A non-transitory machine-readable medium that provides instructions, which when executed by processing circuitry, cause a network entity to perform the method according to claim 1.

9. The method according to claim 1,
   wherein the in-band interface uses a same frequency band as used for direct wireless access by the user terminals to the first radio base station in the wireless communication system, and
   wherein the out-of-band interface uses a different frequency band than used for access in the wireless communication system.

10. A method in a radio base station that provides direct wireless access to user terminals of a wireless communication system for providing backhaul support, wherein the radio base station has an in-band interface wireless communication with a set of one or more other radio base stations and has access to a backhaul path to a core network, the method comprising:
    receiving, from a network entity, a request for available capacity for backhauling of another radio base station via the in-band interface and said backhaul path which the another radio base station is one of said set of one or more other radio base stations, wherein the request includes information about the backhaul path;
    measuring the available capacity for backhauling of said another radio base station by estimating available capacity for backhauling on said backhaul path and estimating available capacity for backhauling on the in-band interface to derive a total available capacity for backhauling of said another radio base station via the in-band interface and said backhaul path; and
    sending, to the network entity, a response comprising said total available capacity for backhauling of said another radio base station.

11. The method according to claim 10, further comprising providing backhauling to a first radio base station out of said set of one or more other radio base stations through said in-band interface and said backhaul path to the core network.

12. The method according to claim 11, further comprising initiating disconnection of the backhauling provided to the first radio base station for a portion of traffic.

13. The method according to claim 12, further comprising receiving information about an alternative backhaul path that is available for the first radio base station through an out-of-band interface and wherein the initiating disconnection is performed only if said information about the alternative backhaul path indicates that the alternative backhaul path has sufficient capacity for backhauling of said portion of traffic.

14. The method according to claim 13, wherein the initiating disconnection comprises sending a message to the first radio base station to trigger the first radio base station to use the alternative backhaul path for backhauling of said portion of traffic.

15. The method according to claim 11, wherein the initiating disconnection is performed in response to detection of a lack of capacity for providing backhauling through said in-band interface and said backhaul path to a third radio base station which does not have an out-of-band interface to a backhaul path.

16. A non-transitory machine-readable medium that provides instructions, which when executed by processing circuitry, cause a radio base station to perform the method according to claim 10.

17. The method according to claim 10, wherein the in-band interface uses a same frequency band as used for direct wireless access by the user terminals to the first radio base station in the wireless communication system.

18. A network entity for use in a wireless communication system, wherein the network entity is configured for selection of a backhaul path to a core network for a first radio base station that provides direct wireless access to user terminals, wherein the first radio base station has access to a first backhaul path to the core network through an out-of-band interface and access to at least one second backhaul path to the core network, via at least one second radio base station, through an in-band interface, the network entity comprising:
- a transmitter configured to send, to the at least one second radio base station, a request for available capacity on the at least one second backhaul path for backhauling through the in-band interface of the first radio base station, wherein the request includes information about the first backhaul path;
- a receiver configured to receive, from the at least one second radio base station, at least one response including information on the available capacity on the at least one second backhaul path to the core network through the in-band interface for backhauling of the first radio base station; and
- processing circuitry configured to select the first backhaul path to the core network through the out-of-band interface or one of the at least one second backhaul path to the core network through the in-band interface for a portion of traffic based on the received information on the available capacity on the at least one second backhaul path for backhauling of the first radio base station that provides direct wireless access to user terminals.

19. The network entity according to claim 18, wherein said processing circuitry is configured to compare the available capacity associated with the first backhaul path and the at least one second backhaul path respectively and select the backhaul path with the largest available capacity.

20. The network entity according to claim 18, wherein said processing circuitry is further configured to initiate configuration of the first radio base station to apply the selected backhaul path for said portion of traffic.

21. The network entity according to claim 18, wherein the network entity is comprised in the first radio base station.

22. The network entity according to claim 18, wherein the network entity is comprised in an operation and management system of the wireless communication system.

23. The network entity according to claim 18
wherein the in-band interface uses a same frequency band as used for direct wireless access by the user terminals to the first radio base station in the wireless communication system, and
wherein the out-of-band interface uses a different frequency band than used for access in the wireless communication system.

24. A radio base station that provides direct wireless access to user terminals for use in a wireless communication system, wherein the radio base station comprises:
- a receiver;
- a transmitter;
- processing circuitry;
- an in-band interface configured for wireless communication with a set of one or more other radio base stations; and
- an interface through which the radio base station has access to a backhaul path to a core network, wherein:
- the receiver is configured to receive, from a network entity, a request for available capacity for backhauling of another radio base station via said radio base station and said backhaul path, which the another radio base station is one of said set of one or more other radio base stations, wherein the request includes information about the backhaul path;
- the processing circuitry is configured to measure the available capacity for backhauling of said another radio base station by estimating available capacity for backhauling on said backhaul path and estimating available capacity for backhauling on the in-band interface to derive a total available capacity for backhauling of said another radio base station via the in-band interface and said backhaul path; and
- the transmitter is configured to send, to the network entity, a response comprising said total available capacity for backhauling of said another radio base station.

25. The radio base station according to claim 24, wherein the processing circuitry is further configured to initiate disconnection of backhauling provided to a first radio base station out of said set of one or more other radio base stations for a portion of traffic.

26. The radio base station according to claim 25, wherein the receiver is configured to receive information about an alternative backhaul path that is available for said first radio base station through an out-of-band interface and wherein said processing circuitry is configured to initiate said disconnection only if the radio base station has received information about said alternative backhaul path that indicates that the alternative backhaul path has sufficient capacity for backhauling of said portion of traffic.

27. The radio base station according to claim 26, wherein said processing circuitry is configured to initiate said disconnection by initiating said transmitter to send a message to said first radio base station to trigger the first radio base station to use said alternative backhaul path for backhauling of said portion of traffic.

28. The radio base station according to claim 25, wherein said processing circuitry is further configured to initiate said disconnection in response to detection of a lack of capacity for providing backhauling through said in-band interface and said backhaul path to a third radio base station which does not have an out-of-band interface to a backhaul path.

29. The radio base station according to claim 24,
wherein the in-band interface uses a same frequency band as used for direct wireless access by the user terminals to the first radio base station in the wireless communication system.

* * * * *